United States Patent [19]

Hultsch

[11] Patent Number: 4,997,575

[45] Date of Patent: Mar. 5, 1991

[54] FILTERING CENTRIFUGE

[75] Inventor: Guenther Hultsch, Oberschleissheim, Fed. Rep. of Germany

[73] Assignee: Krauss-Maffei A.G., Fed. Rep. of Germany

[21] Appl. No.: 53,879

[22] Filed: May 26, 1987

[30] Foreign Application Priority Data

May 27, 1986 [DE] Fed. Rep. of Germany ....... 3617768

[51] Int. Cl.[5] ............................................ B01D 17/038

[52] U.S. Cl. .................................... 210/741; 210/107; 210/108; 210/137; 210/147; 210/180; 210/368; 210/375; 210/396; 210/744; 210/781; 210/798; 210/808

[58] Field of Search ............... 210/739, 740, 741, 744, 210/780, 781, 782, 808, 103, 104, 105, 107, 108, 117, 134, 136, 141, 143, 145, 147, 178, 180, 188, 211, 360.1, 368, 375, 416.1, 369, 396, 380.1, 137, 411, 798

[56] References Cited

U.S. PATENT DOCUMENTS

| | | | |
|---|---|---|---|
| 3,385,443 | 5/1968 | Cuza | 210/178 |
| 3,504,794 | 4/1970 | Tholl et al. | 210/375 |
| 3,864,256 | 2/1975 | Hultsch et al. | 210/781 |
| 4,101,421 | 7/1978 | Hultsch | 210/781 |

OTHER PUBLICATIONS

*Chemical Engineer's Handbook,* 5th Ed., Perry and Chilton (ed.), McGraw-Hill Book Co., 1973, pp. 19-88.

Handbook of Chemistry & Physics, Forty-Eight Edition, Published 1967, Robert C. Weast & Samual M. Selby, pp. F-63.

*Primary Examiner*—Peter Hruskoci

*Assistant Examiner*—Joseph Drodge

*Attorney, Agent, or Firm*—Fulbright & Jaworski

[57] ABSTRACT

In a filter centrifuge with a filter medium, a filter cake is formed following the introduction of a suspension. In a first filtration phase the suspension is exposed to centrifugal filtration a first filtration which dewaters by the inertia forces. In a second filtration phase, the cake is subjected to compressed gas filtration using frictional forces generated by a gas flow. In the second filtration phase, gas at atmospheric pressure flows through the filter cake and filter medium and is exhausted from a filtrate collector space. This space is composed of a gas space and a filtrate liquid space. To obtain flow through the solid cake at an increased pressure difference, it is proposed to provide the filter centrifuge in a pressure housing with a superatmospheric pressure controlled by a difference in filtrate liquid levels in the filtrate liquid space and the annular space following the filter. This liquid control prevents the penetration of filtrate liquid into the gas exhaust line.

23 Claims, 1 Drawing Sheet

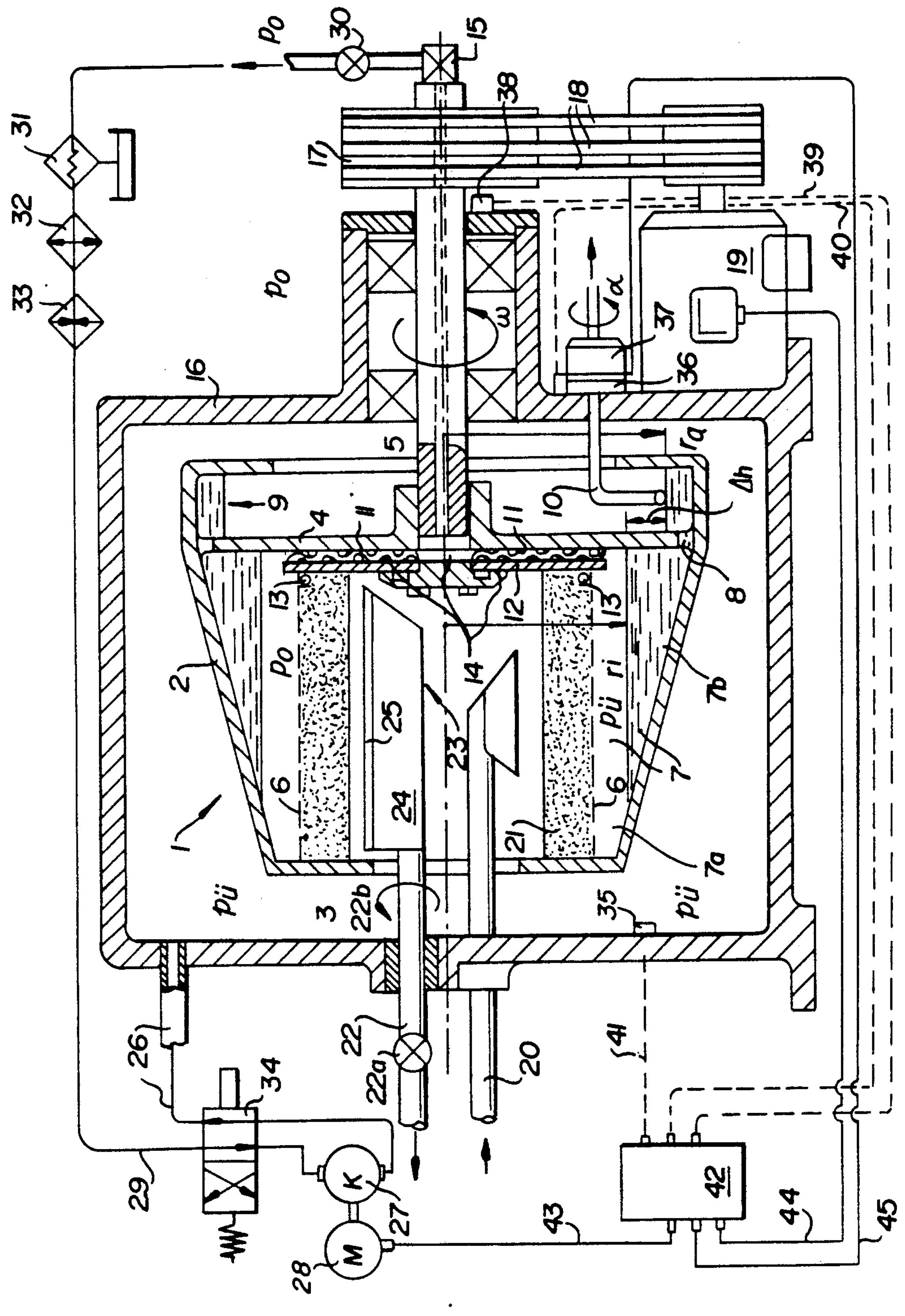
po
30
15
38
18
17
31
32
33
39
40
19
po
ω
α
37
36
16
5
ra
Δh
10
9
4
11
11
8
13
12
13
14
po
pü
ri
7b
2
25
23
24
6
6
7
21
7a
1
pü
3
22b
35
pü
26
22
20
41
34
22a
29
K
27
M
28
42
43
44
45

FILTERING CENTRIFUGE

BACKGROUND OF THE INVENTION

The invention relates to a centrifuge apparatus and process for vacuum or pressure filtration. Appropriate controls and connections permit reverse flushing of the filter, discharge at reduced rotation speed, adaptation of different suspensions, and recycle of vaporous solvents.

DISCUSSION OF RELATED TECHNOLOGY

A centrifuge is discussed in U.S. Pat. Nos. 3,943,056; 4,052,303; and CH 580 986 in which the gas space outside the filter medium is connected with an air evacuation system. This centrifuge may operate with a first filtration by centrifugation and a second phase with dry centrifuging. This dry filtration is also called a pressure filtration in which gas flows through the filter cake to assist liquid removal. A pressure difference between the filter cake surface and the gas space is set for somewhere between the atmospheric pressure and the filtrate vapor pressure. Low pressure differences may be obtained but the production of reduced pressure by means of the air exhaust installation is relatively costly. Furthermore, large gas volumes must be removed to produce an operational vacuum filtration process. The teachings of U.S. Pat. Nos. 3,943,056 and 4,052,303 are herein incorporated by reference. The article, "Effect of operating parameters on the effectiveness of the rotation siphon in peeling centrifuges", *Chemie-Ingenieur-Technik*, vol. 51, No. 1 (1979), teaches combining centrifugal filtering with vacuum or pressure filtering in a centrifuge with a rotation siphon. However, it is necessary to prevent any passage of gas through the filter cake to achieve the required reduced pressure outside the filter medium and still obtain pressure control from the siphon's effects.

SUMMARY OF THE INVENTION

One purpose of the invention is to obtain a larger pressure difference during pressure gas filtration between the surface of the filter cake and the gas space behind the filter medium. This pressure differential improves the filtration and drying effects that may be obtained by centrifugation.

This objective is attained by a centrifuge apparatus comprising:

a pressure housing, a solid jacket drum, an annular filter medium within the drum, a collector space between the drum and filter medium for liquid filtrate and gas; a drain opening for liquid filtrate between the collector space and an annular filtrate withdrawal space; a pivotable withdrawal conduit within the filtrate withdrawal space for control of the liquid level within the withdrawal space; and a gas exhaust line leading from the centrifuge.

Additionally, the apparatus comprises a means for pressurizing the interior of the pressure housing. A pressure differential then exists between the housing interior and the gas exhaust line.

The hydrostatic head$^{(Pz)}$ may be determined and controlled by the following relationship:

$$Pz=\tfrac{1}{2}\delta_L W^2 (r_a^2-r_i^2)$$

wherein:

$r_i$=radial liquid level in the filtrate liquid space, $r_a$=radial liquid level in the annular space, $P_z$=centrifugal pressure of the liquid column with a radial height of $\Delta h$ in the centrifugal field, $\Delta h$=liquid column as the difference of $r_a-r_i$, W=angular velocity of the filter centrifuge, and $\delta_L$=density of the filtrate liquid.

The gas exhaust line is conveniently equipped with a check valve. This valve generates a gas cushion in the gas exhaust line and prevents penetration of liquid into the gas return line. For example, the check valve is closed during flushing to form a static head at a higher pressure than the solids discharge line.

In a preferred embodiment, the gas exhaust line located in the filter centrifuge comprises a spacer grid radially extending from the hollow bore in the shaft to the collector gas space. On the side toward the centrifuge drum, the grid has a sealing disk of a liquid and gas tight material. This disk-shaped zone acts as a droplet separator as the gas passes through the solid filter cake, expands, and flows radially inward at a low flow velocity. The high accelerating forces in the centrifugal field cause an intense precipitation of droplets from the gas which may be further enhanced by appropriate configurations of the spacer grid in the precipitating space.

The disk resting on the spacer grid preferably comprises rubber so that it may be readily installed and replaced even with a very narrow filter centrifuge opening.

The gas exhaust line may be connected with the pressure line to loosen the filter cake on the filter medium by means of countercurrent gas flow.

To increase the efficiency or when gases are used that must be held in closed circulation, the exhaust line gas is recycled to the suction side to the pressure generating means. For a gas in closed circulation through the filter cake, preferably a suction-pressure pump is used as the pressure generating means. The suction side is connected with the gas exhaust line, and the pressure side communicates with the internal space of the filter centrifuge.

In closed circulation, gases and vapors of different type may be used as needed. For example, vapor phase solvents are useful in some processes. Similarly, condensing, heating, or cooling devices may be installed as required.

For discharge of the dewatered solids, a peeling blade pivots into the solid cake. The blade communicates with a collecting trough and a discharge pipe passing through the pressure housing. The pressure housing is equipped with a check valve which permits discharge of the solid components falling into the trough. The pressure contained in the pressure housing drives material through the discharge pipe to the outside.

For automatic control of the apparatus in varying processes, a variety of sensors and response systems may be used. For example, the process of operation must be flexible for the use of different suspensions, reverse flushing of the filter medium, and solids discharge at reduced rotation speeds compared to the filtration. The means for pressurizing the centrifuge will have a pressure transducer in the pressure housing for measuring the pressure. Adjustments to the withdrawal conduit angle may be displayed by appropriate connections to the adjusting device. A rotation speed display is useful for monitoring the filter rotation drive. Appropriate coordination will achieve the operational flexibility contemplated.

It is convenient to set these operating modes by means of programmed controls. For example, loosening the base layer compressed by the peeling blade uses a reverse flushing of the filter medium by varying the pressure conditions whereby the filtrate is pressured radially from the outside through the filter medium. This sequence may use automatic pressure set points and times for automatic operation.

BRIEF DESCRIPTION OF THE DRAWING

An example of embodiment of the invention is described below in more detail with reference to the drawing, which shows in a sectional view a cantilevered filter centrifuge enclosed in a pressure housing.

DETAILED DESCRIPTION OF THE DEPICTED EMBODIMENT

The filter centrifuge 1 has a solid jacket drum 2, comprising an annular weir 3 opposite drum bottom 4, in which shaft 5 is mounted. Within solid jacket drum 2, a cylindrical filter medium 6 is fastened to annular weir 3 and drum bottom 4. Between filter medium 6 and solid jacket drum 2 is a filtrate collector space 7 composed of gas space 7*a* and filtrate liquid space 7*b*.

The filtrate liquid space 7*b* is connected by a drain opening 8 in drum bottom 4 with annular filtrate withdrawal space 9 into which filtrate withdrawal conduit 10 protrudes. Spacer grid 11 and cover disk 12 (which is preferably of an elastomeric material) are fastened to drum bottom 4. The disk is sealed in its radially outer area against filter medium 6 by circumferential, annular gasket 13.

The space defined by drum bottom 4, spacer grid 11 and disk 12 represents a droplet separation zone for exhaust line 14. The path through this zone is from the gas space 7*a*, through spacer grid 11, into a hollow bore in shaft 5, out through rotating passages 15. Shaft 5 is rigidly connected to drum bottom 4.

The filter centrifuge 1 is enclosed by a pressure housing 16, which supports rotating shaft 5. Outside pressure housing 16, shaft 5 has a V-belt pulley 17 whereby the filter centrifuge may be driven by V-belts 18 and drive unit 19.

Opposite drive unit 19, inlet pipe 20 enters pressure housing 16. The suspension for filtration is introduced by pipe 20 into the filter centrifuge. The solid components settle on filter medium 6 and form a solid cake 21 after dewatering.

The pressure housing 16 further comprises discharge pipe 22 of a peeling device 23. Inside filter centrifuge 1 peeling device 23 comprises a collector trough 24 and a peeling blade 25. Outside pressure housing discharge pipe 22 has a check valve 22*a*.

Pressure housing 16 also has pressurized gas line 26. The pressure line is fed by compressor 27 which is controlled by a variable drive motor 28.

Feeder line 29 of compressor 27 connects with gas exhaust line 14. Between gas exhaust line 14 and compressor 27, feeder line 29 connects with rotating passage 15, a check valve 30, condenser 31, radiator 32 and heater 33. Furthermore, a 4/2 way valve 34 is arranged in feeder line 29 and pressure gas line 26, so that the inside of pressure housing 16 may be exposed to pressurized gas and compressed gas may be supplied to gas exhaust line 14 for reversing the flow across filter medium 6. This reversal flushes filter medium 6 and is accomplished by gas flow redirection through valve 34.

Inside the pressure housing 16 is a pressure transducer 35 to measure the over pressure $p_u$.

The withdrawal conduit 10 comprises device 36 for measuring the angular position $\alpha$ of the withdrawal conduit. This angle is directly proportional to the radial liquid level $r_a$ in the annular space 9. The height of the radial liquid level $r_a$ controls the pressure across drain 8 and, thus, the pressure across filter medium 6. A lower level permits faster filtration.

The angular position measurement device 36 of peeling pipe 10 is coupled with rotary actuator 37 for control over the angular position $\alpha$of peeling pipe 10. Controlling the peeling pipe angle affects the liquid level $r_a$ in annular space 9 as discussed above.

At the exit of shaft 5 from pressure housing 16, a rotation counter 38 is provided for measuring the rpm or angular velocity W of shaft 5.

The pressure transducer 35, angular measurement device 36 and the rpm counter 38 are connected by measuring lines 39, 40 and 41 (indicated by broken lines) with control unit 42. The measured values transmitted by the lines 39, 40 and 41 are the overpressure $P_u$, the angular position $\alpha$ or the liquid level $r_a$, and the rpm or the annular velocity W. They are processed with appropriate preparation and conversion so that drive motor 28, drive unit 19, and the rotary actuator 37 may be actuated by signals from control lines 43, 44 and 45 (shown by solids lines) in concert with operating programs stored in control unit 42.

In an exemplary operation, compressor 37 takes air from the atmosphere for delivery at or above 0 (zero) psig through a pressure line 26 to inside pressure housing 16. The suspension is introduced into filter centrifuge 1 by feeder pipe 20 with the suspended solids settling in the centrifugal field onto filter medium 6 as a solid cake 21. The liquid filtrate passes into filtrate collector space 7, forming gas space 7*a* and filtrate liquid space 7*b* with a radial liquid level $r_i$. The filtrate passes through drain opening 8 into annular filtrate withdrawal space 9 with a radial liquid level $r_a$ as determined by the angular position $\alpha$ of withdrawal conduit 10. Between liquid level $r_a$ and liquid level $r_i$ a liquid column with height $\Delta h = r_a - r_i$ is established. The hydrostatic pressure $p_z$ across the filter medium corresponds to the pressure difference $\Delta p = p_u - p_o$, established between gas space 7*a* (with a pressure $p_o$) and the rest of the internal space within pressure housing 16 (with a pressure $p_u$). This hydrostatic pressure $p_z$ insures that filtrate liquid cannot penetrate into gas exhaust line 14 and that gas space 7*a* is maintained at pressure $p_o$. After centrifugation, filter cake 21 may be exposed to a dry centrifuging and a compressed gas filtration. Dry centrifuging and compressed gas filtration expose the cake to the frictional action of a gas flowing through the cake at a pressure gradient of $\Delta p = p_u - p_o$. After passing through cake 21, the compressed gas passes the radius of spacer grid 11 to gas exhaust line 14, rotating passage 15, and outside the pressure housing 16.

The gas may discharge into the atmosphere or, as shown in the drawing, it may be returned in a closed circulation through feeder line 29 to the suction side of compressor 27. In the course of recirculation, the gas may be acted on by means of other devices, such as condenser 31, radiator 32, or heater 33. These devices may also be provided in any order or location in addition to those shown. Thus, heater 33 may follow compressor 27 to expose solid cake 21 to the hottest possible gas while avoiding high heat losses.

In place of gases, vapors of chemically or biologically reactive substances may also be conducted in a closed circulation.

By means of the 4/2 way valve 34, the gas flow direction may also be reversed (switching position not shown) to cause it to flow through filter medium 6 in the inverse direction to loosen up solid cake 21.

To discharge the solids, gas exhaust line 14 is first closed off by check valve 30. Subsequently, peeling device 23 is pivoted in the direction of arrow 22*b* by swiveling discharge pipe 22 whereupon peeling blade 25 is pressed into the solid cake 21. The particles loosened by blade 25 and the reduced rpm fall into collector trough 24. Check valve is opened and the solids are conveyed by the compressed gas through discharge pipe 22 to the outside.

In operation, the rpm or angular velocity W, the liquid column height Δh, and the pressure difference Δp are correlated by the control unit 42 such that the penetration of filtrate liquid into gas exhaust line 14 is prevented. Furthermore and in normal operation, the parameters Δp and Δh are correlated with each other so that solid cake 21 is exposed to the gas or a vapor flow with the highest efficiency. Similarly, during the reverse flow through filter medium 6 and in the discharge process, the aforementioned parameters are correlated with a reduced rpm for good solids loosening, good cleaning of filter medium 6, and good discharge of the peeled solids.

By means of the control unit, each of the check valve 22*a*, the pivoting device for the discharge pipe 22, the check valve 30, the 4/2 way valve, the condenser 31, the radiator 32, and the heater 33 may also be actuated to obtain a fully automatic operation with a constant sequence of charging, drying, discharge and reverse flushing phases.

For reverse flushing of the filter medium, liquid may be introduced through the filtrate withdrawal conduit. By appropriate geometry of the solid jacket drum and controlled rotation, introduced liquid flows to the filtrate collector space 7 through drain opening 8. Liquid collects to a height in the collector space such that a reverse flow through the filter medium is established. Flushing liquid may be withdrawn through the solids discharge conduit 24, suspension inlet conduit 20, or over weir 3 for discharge through appropriate exits in pressure housing 16 (not shown).

Alternatively, the flushing water may be introduced through inlet conduit 20. The liquid in collector space 7 is allowed to collect to a height that the filter medium is at least partially in contact with the liquid. The liquid level control is accomplished by appropriate control over the discharge angle of filtrate withdrawal conduit 10 and the openings in solid jacket drum 2, e.g. weir 3.

It should be noted that the drawings and description are not intended to limit the scope of my invention. Each is merely illustrative of an embodiment encompassed by the invention.

I claim:

1. An apparatus for centrifugal filtration of suspended solids, said apparatus comprising;

a pressure housing defining a pressurized space;

a drive shaft having an axis of rotation inside said pressurized space;

a filtrate inlet conduit for introducing filtrate of a density $d_L$ containing suspended material;

a filter medium connected to said drive shaft and centered on said axis of rotation, defining an interior space communicating with said pressurized space, and surrounding said inlet conduit;

a solid jacket drum connected to said drive shaft and centered on said axis of rotation, surrounding said filter medium, and defining a filtrate collector space;

a partition in said filtrate collector space defining a filtrate withdrawal space in communication with said filtrate collector space;

a filtrate withdrawal conduit having an end within said filtrate withdrawal space positioned to establish a liquid level $r_a$;

a gas exhaust conduit in communication with said filtrate collector space;

a pressure conduit in communication with said pressure housing;

means for generating pressure in said pressure conduit so as to produce a pressure $p_u$, within said pressure housing and inside said interior space;

means for reducing pressure in said gas exhaust conduit below said pressure $p_U$, to a pressure $p_O$ resulting in a pressure gradient Δp where $\Delta p = p_u - p_O$;

means for rotating said drive shaft at an angular velocity w whereby a filter cake is formed on said filter medium and a filtrate liquid level $r_i$ substantially below said gas exhaust conduit is established in said filtrate collector space; and means for controlling operation of said apparatus whereby a hydrostatic pressure $p_z$ is maintained across said filter medium corresponding to said pressure gradient Δp where $$p_z \tfrac{1}{2} d_L (w^2)(r_a^2 - r_i^2);$$

and means for reverse flushing said filter medium while rotating said filter at a reduced rotational speed compared to a filtration rotational speed.

2. An apparatus according to claim 1, wherein said filtrate withdrawal space is axially disposed within said solid jacket drum and with respect to said filtrate inlet conduit.

3. An apparatus according to claim 2, wherein said filtrate withdrawal space is annular to said gas exhaust conduit.

4. An apparatus according to claim 3, wherein said filtrate withdrawal conduit comprises an angled conduit section within said annular withdrawal space.

5. An apparatus according to claim 4, wherein said filtrate withdrawal conduit further comprises means for radially adjusting said end of said filtrate withdrawal conduit within said annular withdrawal space.

6. An apparatus according to claim 5, further comprising means for controlling said means for radially adjusting.

7. An apparatus according to claim 1, wherein a portion of said gas exhaust conduit is aligned with said axis of rotation.

8. An apparatus according to claim 7, further comprising connection means for rigidly connecting said gas exhaust conduit to said solid jacket drum.

9. An apparatus according to claim 8, wherein said connection means further comprises fluid communication means for establishing said fluid communication between said gas exhaust conduit and either or both of said filter medium and said filtrate collector space.

10. An apparatus according to claim 9, wherein said fluid communication means comprises a spacer grid.

11. An apparatus according to claim 1, wherein said means for generating pressure is connected by a recycle conduit to said gas exhaust conduit.

12. An apparatus according to claim 11, wherein said recycle conduit comprises a condenser.

13. An apparatus according to claim 11, wherein said recycle conduit comprises a radiator.

14. An apparatus according to claim 11, wherein said recycle conduit comprises a heater.

15. An apparatus according to claim 11, wherein the connections form a closed system for recycle.

16. An apparatus according to claim 11, wherein said recycle conduit comprises a 4 port/2 way valve connected to said pressure conduit for passing pressurized gas to said gas exhaust conduit and said solid jacket drum.

17. An apparatus according to claim 1, further comprising a peeling device comprising a collector blade in adjustable communication with solids retained by said filter medium.

18. An apparatus according to claim 17, wherein said peeling device further comprises a discharge conduit in fluid communication with said collector blade for removing solids freed from said filter medium by said collector blade when in communication with said filter medium.

19. An apparatus according to claim 1, wherein said gas exhaust conduit comprises a check valve.

20. A method for filtration of suspended solids comprising the steps of:

introducing filtrate of a density $d_L$ containing suspended material through a filtrate inlet conduit to an interior space defined by a filter medium, said interior space communicating with a pressurized space surrounding said filtrate inlet conduit; reducing pressure in a filtrate collector space defined by a solid jacket drum surrounding said filter medium to a pressure $p_o$;

generating a pressure $p_u$, within said pressure housing and inside said interior space above said pressure $p_o$, resulting in a pressure gradient $\Delta p$ where $\Delta p = p_u - p_o$;

rotating said filter medium and said solid jacket drum at an angular velocity w whereby a filter cake is formed on said filter medium, a filtrate liquid level $r_i$ substantially below a gas exhaust conduit is established in said filtrate collector space, and said filtrate flows to a filtrate withdrawal spaced defined by a partition in said filtrate collector space; and integrating the steps of reducing, generating, and rotating through a connector control unit thereby maintaining a hydrostatic pressure $p_z$ across said filter medium corresponding to said pressure gradient $\Delta p$ where $$p_z = \tfrac{1}{2} d_L (w^2)(r_a^2 - r_i^2);$$

and reverse flushing said filter medium while rotating said filter at a reduced angular velocity $p_z$ correlated to centrifugal pressure of a liquid column $r_a - r_i$, wherein $r_i$ is a reverse flushing liquid level.

21. A method for filtration according to claim 20, said process further comprising the steps of:

removing said filter cake from said filter medium; and discharging said filter cake from said interior space.

22. A method for filtration according to claim 20, further comprising the steps of:

generating a pressure in said filtrate collector space; and reducing pressure in said pressure housing and inside said interior space.

23. A method for filtration according to claim 20 wherein the step of reducing pressure in said filtrate collector space further comprises:

collecting exhausted gas from reducing pressure in said filtrate collector space; and wherein the step of generating a pressure further comprises reintroducing said exhausted gas into said pressure housing.

* * * * *